United States Patent [19]

Hanson

[11] Patent Number: 5,400,212
[45] Date of Patent: Mar. 21, 1995

[54] PRECONSTRUCTION UTILITY METER PEDESTAL

[75] Inventor: Darrell R. Hanson, Richmond, Mich.

[73] Assignee: David J. Corby, Columbus Township, Mich.

[21] Appl. No.: 216,626

[22] Filed: Mar. 23, 1994

[51] Int. Cl.$^6$ ............................................. H02B 1/00
[52] U.S. Cl. .................................... 361/665; 174/38; 361/659
[58] Field of Search ................... 174/37–38, 174/45 R; 361/659–669; 324/156

[56] References Cited

U.S. PATENT DOCUMENTS

| | | | |
|---|---|---|---|
| Re. 31,359 | 8/1983 | Nickola | 361/659 |
| 3,614,538 | 10/1971 | Nickola | 361/659 |
| 3,868,080 | 2/1975 | Olson | 174/38 |
| 3,879,641 | 4/1975 | Byrd | 317/104 |
| 4,751,610 | 6/1988 | Nickola | 174/38 |
| 4,833,566 | 5/1989 | Nickola | 361/659 |
| 4,864,467 | 9/1989 | Byrd | 361/369 |
| 4,887,187 | 12/1989 | Nickola | 361/664 |

Primary Examiner—Gregory D. Thompson
Attorney, Agent, or Firm—Robert G. Mentag

[57] ABSTRACT

A preconstruction utility meter pedestal for the purpose of providing underground electrical and communication service to a building construction site after a foundation has been constructed but before a building has been erected upon the foundation. The pedestal comprises an elongated, vertical electrical service rigid steel conduit for conducting electrical service from an underground electrical service system to a utility meter box mounted on the upper end of the conduit and having an electric meter mounted therein. The rigid steel conduit is adapted to be fastened by an upper and a lower mounting plate, respectively, to the front face of the foundation. A communication cable plastic conduit, and a temporary electrical power box are carried by the electrical service rigid steel conduit. The electrical service rigid steel conduit supports a telephone interface box mounting bracket for the reception of an interface telephone box.

7 Claims, 7 Drawing Sheets

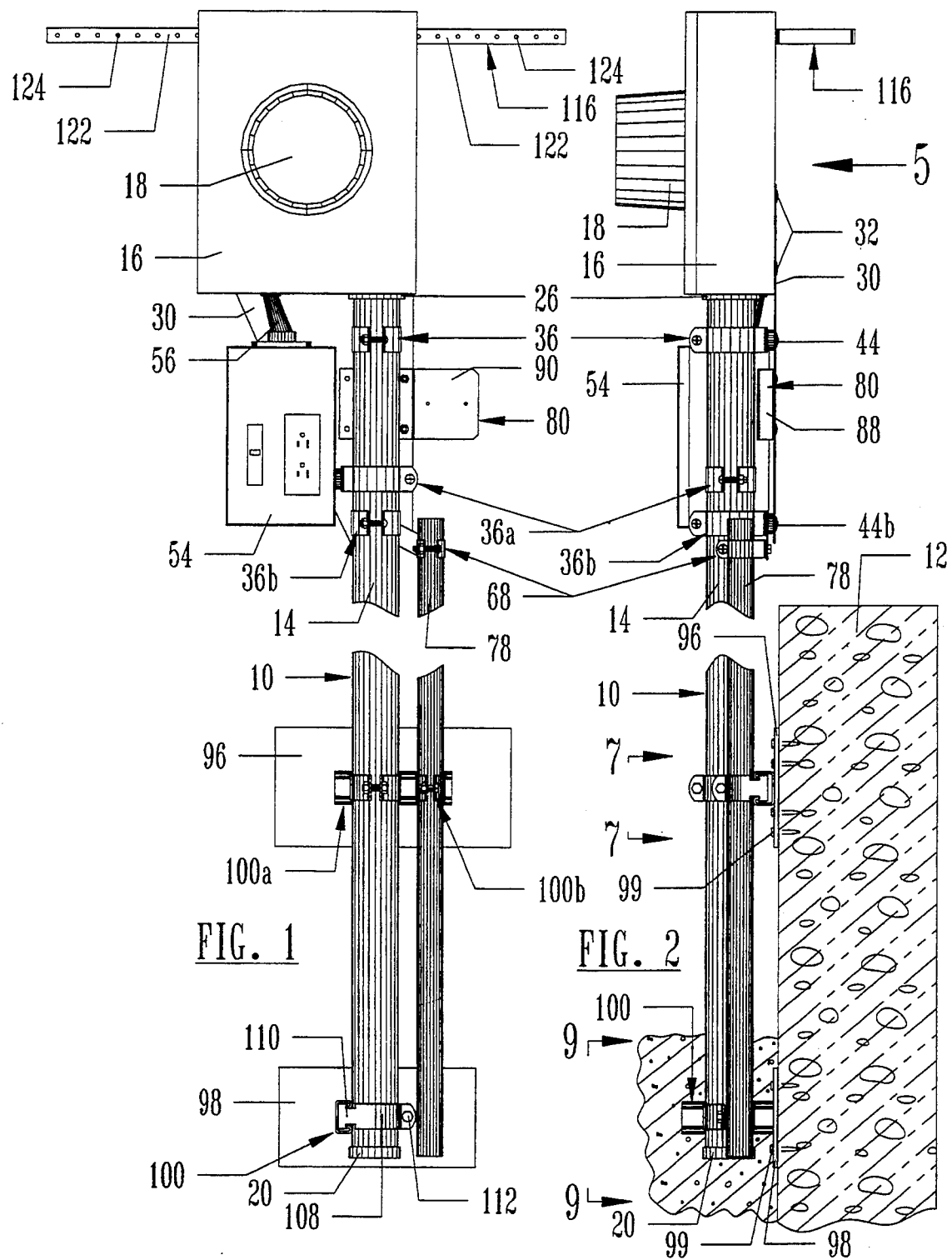

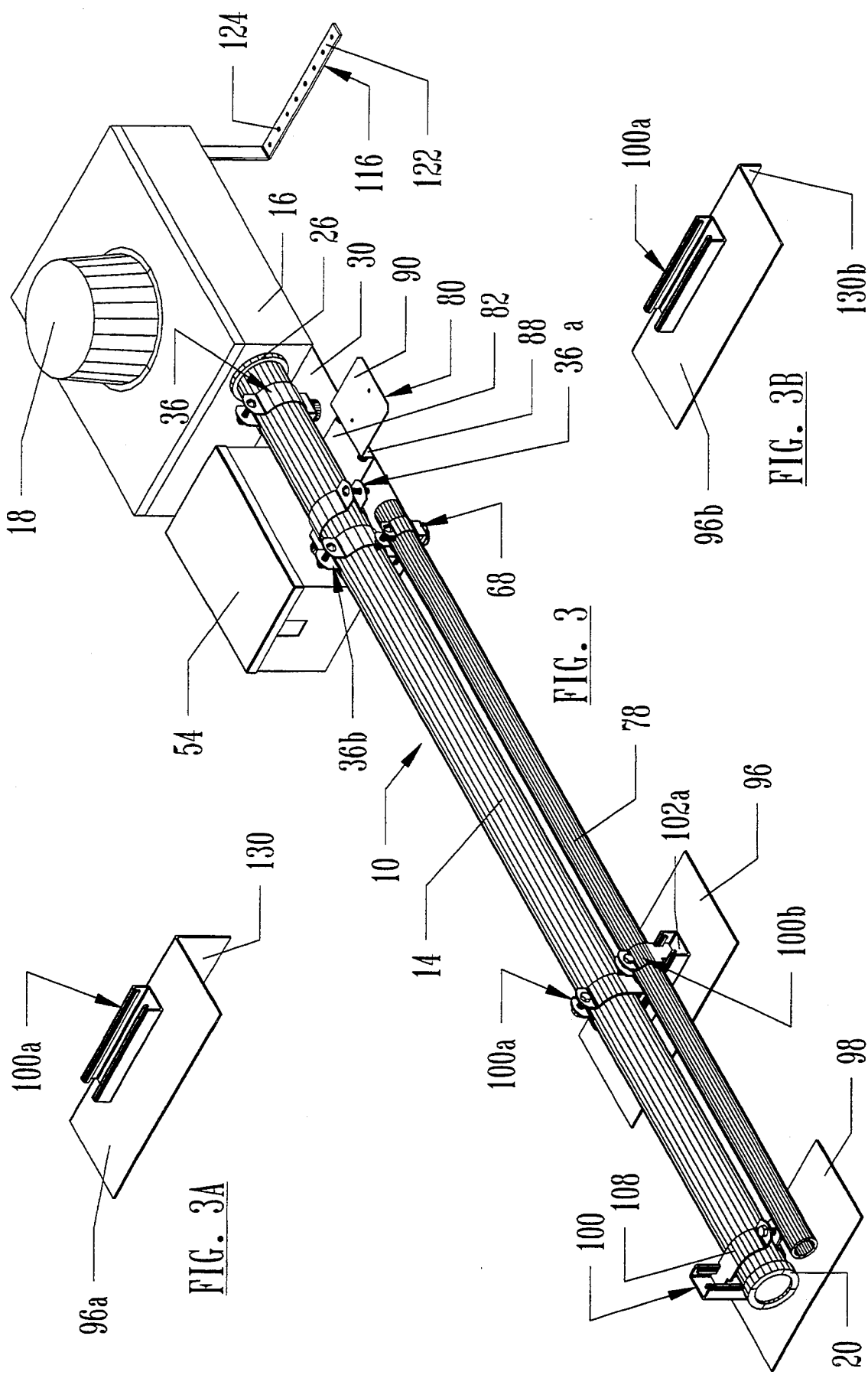

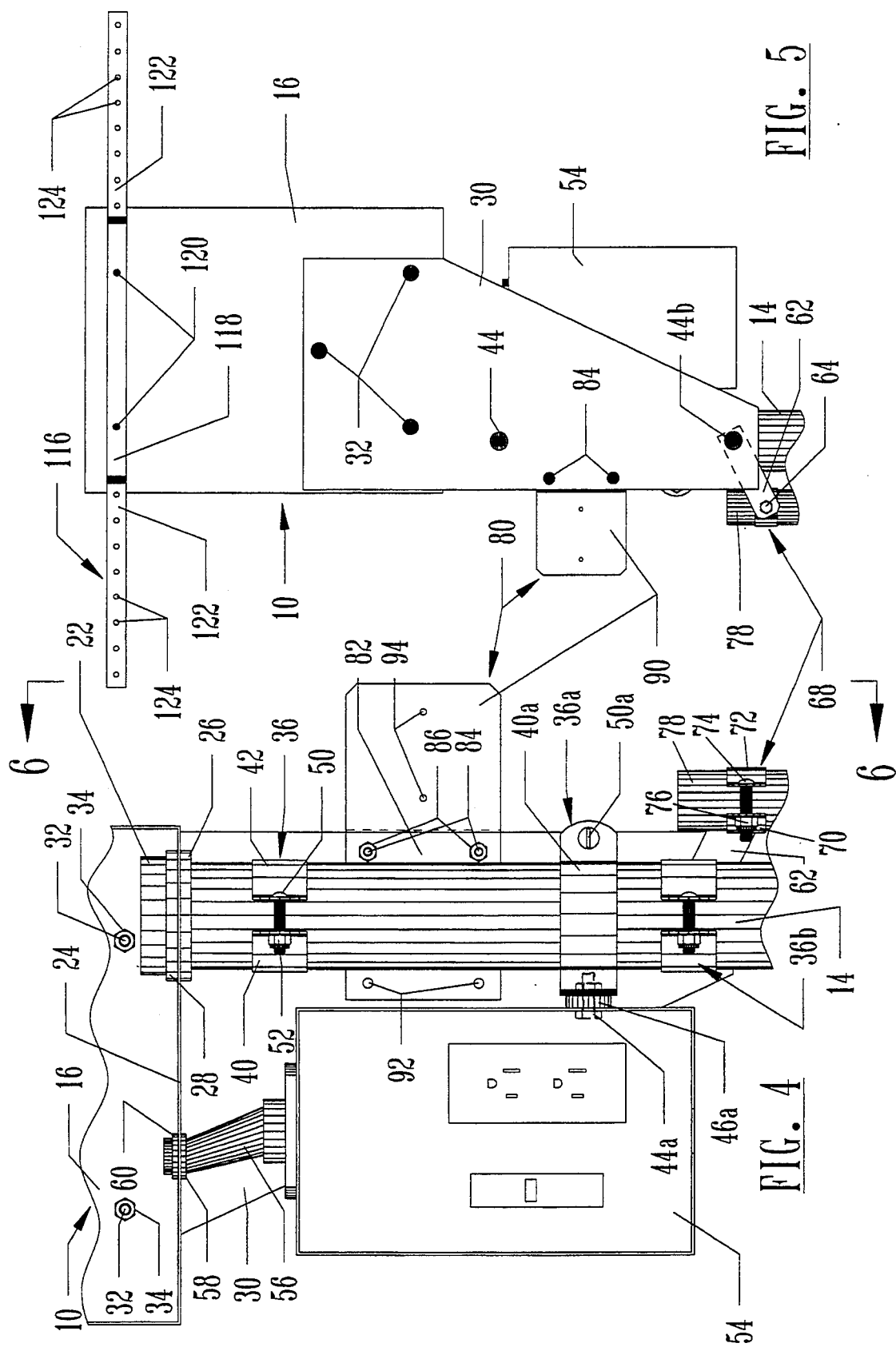

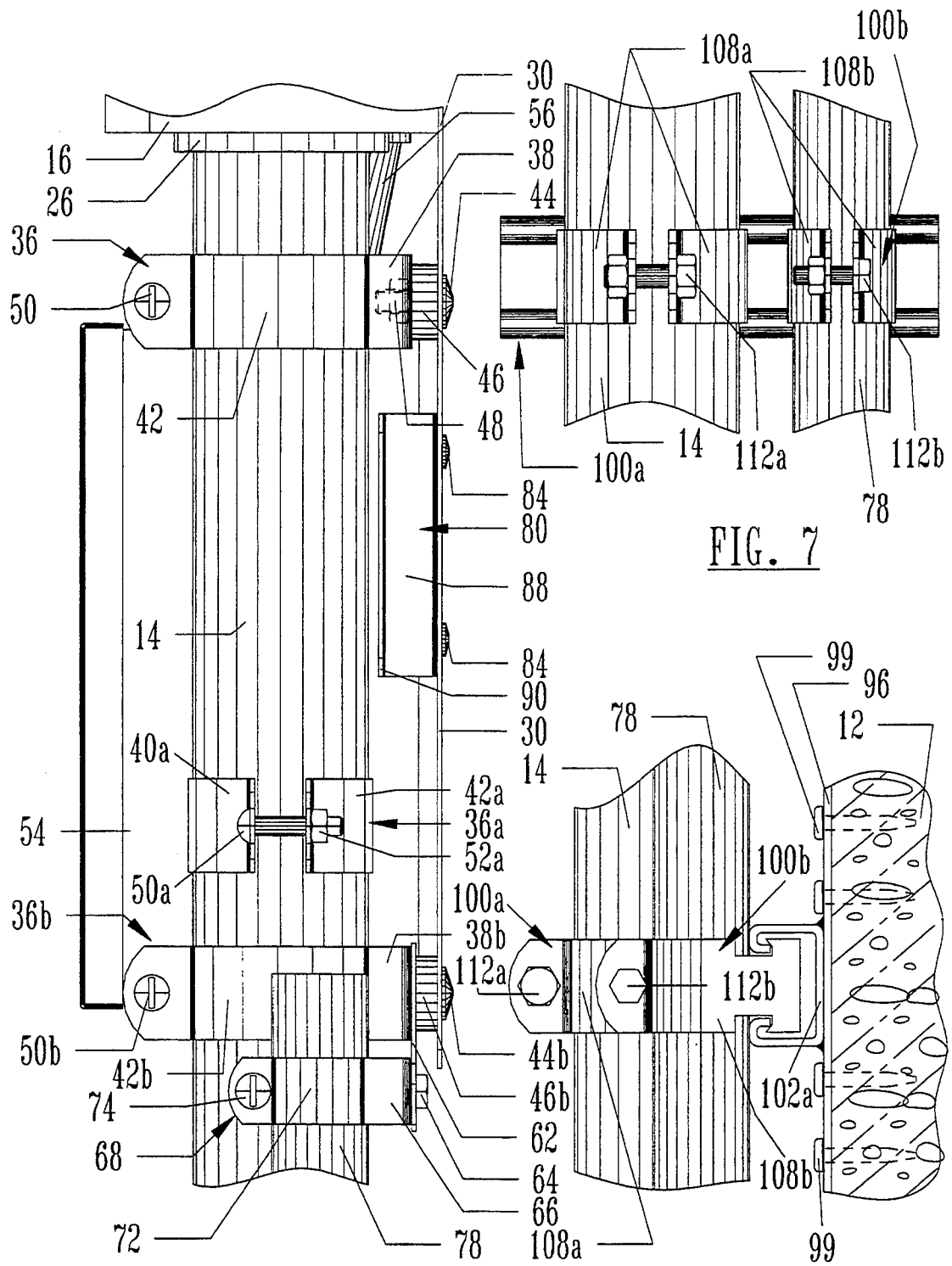

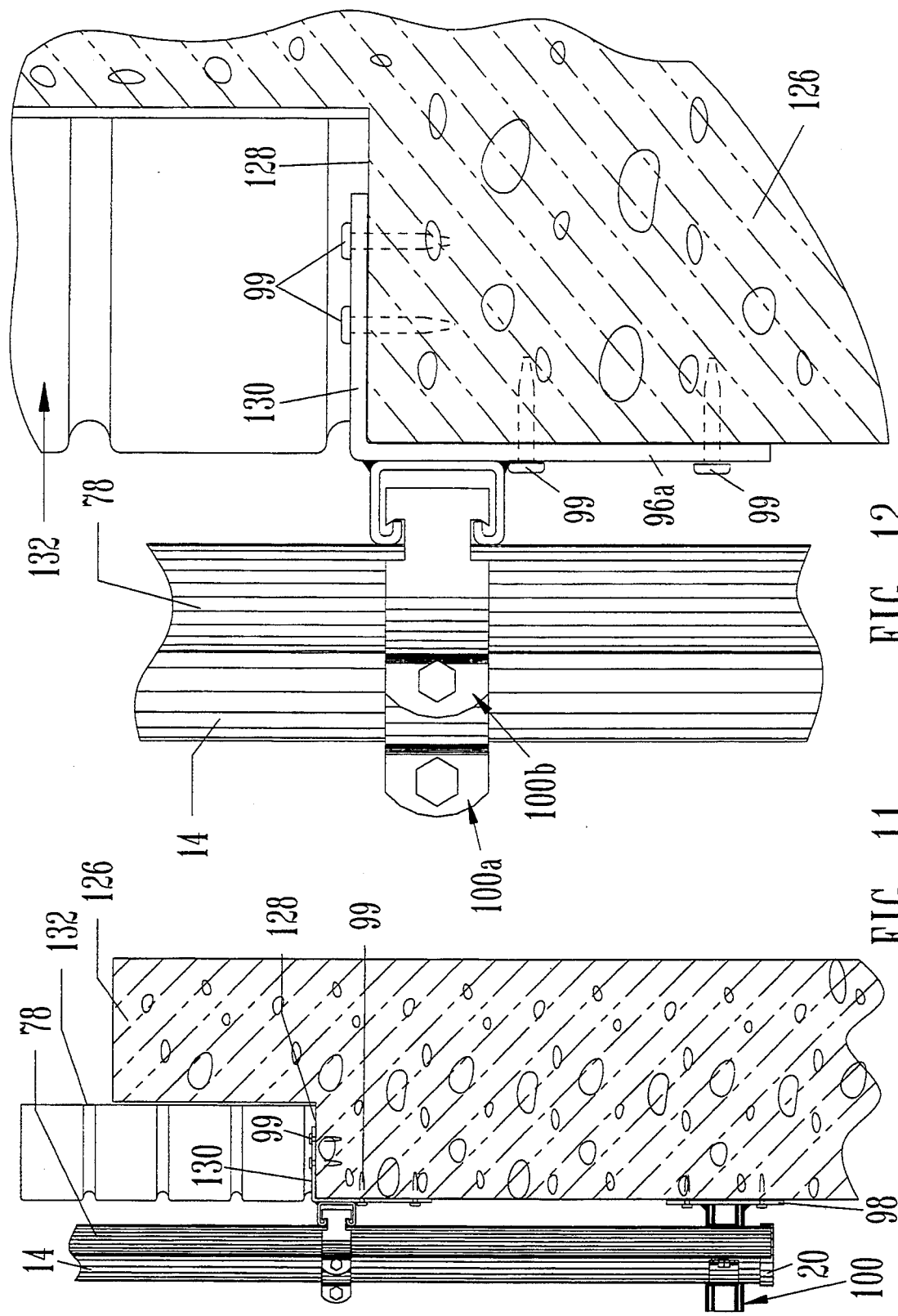

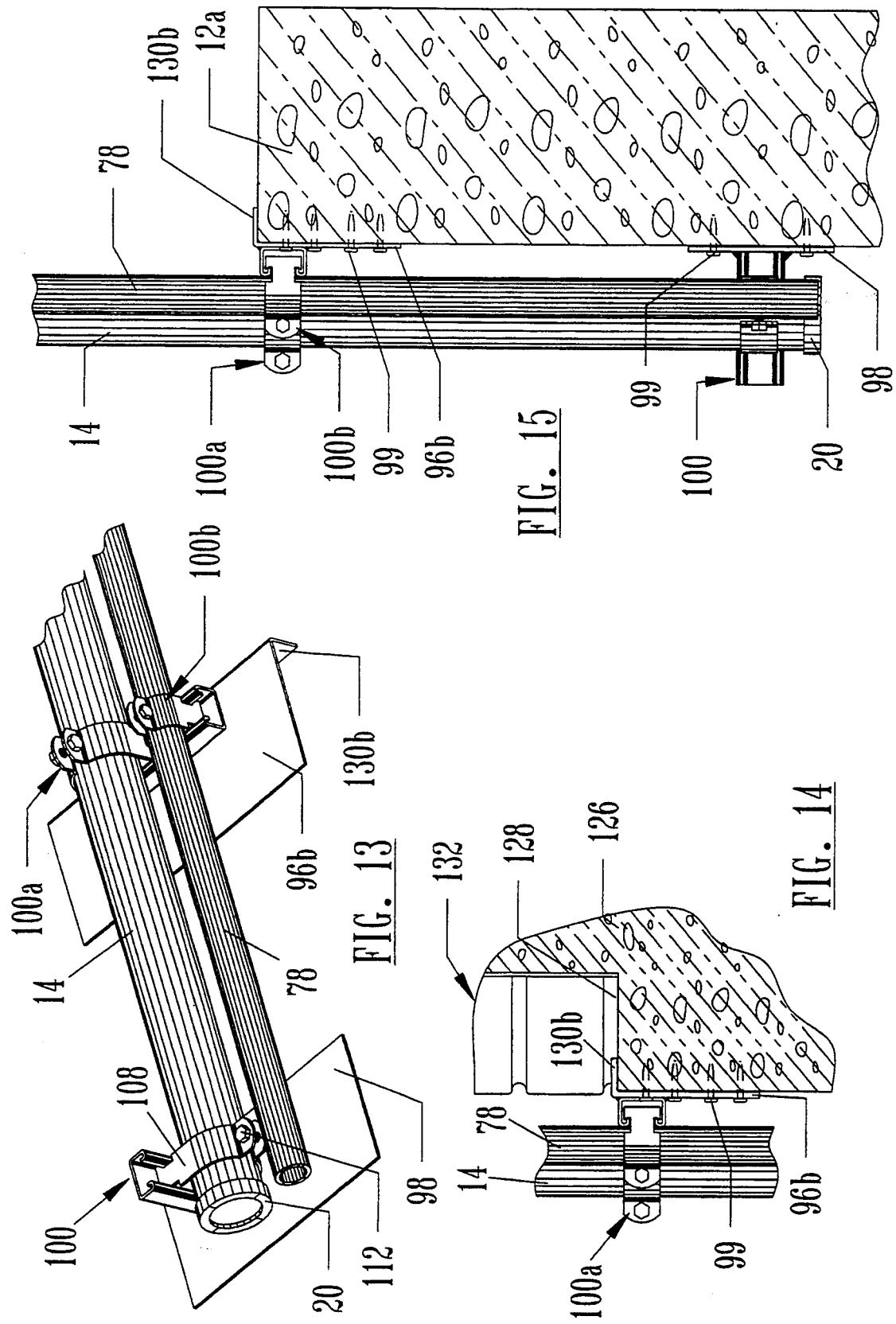

PRECONSTRUCTION UTILITY METER PEDESTAL

BACKGROUND OF THE INVENTION

1. Field of the Invention

The field of art to which this invention pertains may be generally located in the class of devices relating to utility meter pedestals. Class 361, Electrical, Electrical Systems and Devices, United States Patent office Classification, appears to be the applicable general area of the art to which the subject matter similar to this invention has been classified in the past.

2. Description of the Prior Art

This invention relates to a preconstruction utility meter pedestal which is adapted to be mounted on a building foundation, after the foundation has been completed, but before the construction of a building on the foundation has been started. U.S. Pat. No. 4,864,467 discloses a utility meter pedestal which is adapted to be mounted on a building foundation and which includes a rigid, vertical steel post, having an L-shaped cross section, to which top and bottom steel plates are fixedly secured, with the bottom plate comprising a mounting plate lying flush against the outer face of a building foundation at a below grade location and being fastened to the foundation by power driven nails. A utility meter box is mounted on a front face of the upper plate. A rigid, metal flat strap is secured to the rear surface of the metal post in a position between the upper and lower plates, and it extends rearwardly from the post, at a right angle thereto. The rigid, metal flat strap overlies the top of the foundation, and is secured to the top of the foundation by power driven nails. An elongated plastic service conduit is attached to the front face of the post and it extends in parallel spaced relationship with the post. The service conduit houses an electrical service line that extends from an underground utility line to a meter in said utility meter box. The electrical service line conduit is secured to the metal post by means of a clamp bracket.

A problem encountered in the use of the utility meter pedestal disclosed in U.S. Pat. No. 4,864,467 is that the rigid, metal flat strap secured to the top of the foundation is subject to being detached from the foundation and the utility meter pedestal pulled outwardly away from the foundation by building contractors, because the location of said strap conflicts with the operations of carpenters and masons working behind the pedestal in the process of constructing a building on the top of the foundation. Under such construction conditions, the utility meter pedestal disclosed in said patent is subject to damage, and a subsequent rejection by electrical inspectors. Also, follow-up repair operations are necessitated which increase the costs of employing such utility meter pedestals.

A disadvantage in the use of the utility meter pedestal disclosed in said patent is that it is difficult to secure accurately the pedestal post in a vertical position on a foundation, because of the fact that both the lower mounting plate and the rigid, metal flat strap for attachment to the top of the foundation must be attached by power driven nails while the post is held manually in a vertical position by the use of a carpenter's level. In many instances, the action of inserting the power driven nails moves the rigid, metal flat strap and lower plate, so as to move the pedestal post out of the desired vertical position during such action.

Still another disadvantage in the use of the utility meter pedestal disclosed in said patent is that it requires an additional member, besides the rigid, vertical steel post, in the form of a service line conduit to house the power line extension from an underground utility service line to the meter box attached to the top of the rigid, vertical steel post. The utility meter pedestal disclosed in said patent also does not provide any service conduit, for housing communication cables such as phone and cable television service lines, to prevent damage to such cables during a building construction period. Without such a separate service conduit the last mentioned cables are left laying on the ground by the foundation where they may be damaged, and need repair or replacement, at added costs.

SUMMARY OF THE INVENTION

The present invention solves the aforedescribed problems of the prior art utility meter pedestals by providing an improved preconstruction utility meter pedestal for utilities, including electric power, telephone, television and other communication lines which may be installed in the same underground trench. The improved preconstruction utility meter pedestal comprises a vertical tubular support member, such as an elongated rigid steel pipe which is open at the top and bottom ends thereof. A metal utility meter box is rotatably, adjustably secured to the top end of the elongated rigid steel pipe and has operatively mounted therein a conventional utility meter. The elongated rigid steel pipe functions as both a vertical support member for a metal utility meter box and as an electrical service line conduit for conducting or housing an electric service line from an underground utility service line to the utility meter in the metal utility meter box. The utility meter pedestal includes a foundation upper mounting plate and a foundation lower mounting plate for attachment to a building foundation. The elongated rigid steel pipe is adjustably mounted on the foundation upper and lower mounting plates by adjustable clamping means so as to permit the elongated rigid steel pipe to be adjusted up and down to meet a Utility Company specification for meter height above grade on a foundation. The adjustable clamping means also permits the elongated rigid steel pipe to be adjusted left and right to plumb to a vertical position, and in and out to plumb vertical if the foundation outer wall on which the mounting plates are attached is not vertically straight.

The utility meter pedestal includes a top back plate which has its upper end fixed to the back of the metal meter utility box and its lower end rotatably, adjustably secured to the upper portion of the pedestal elongated rigid steel pipe. A temporary outlet box is supported by the metal utility meter box and it is wired to the meter in said meter box and to the electrical service supplied through the elongated rigid metal steel pipe, to provide electrical service availability during the construction phases of the building to be mounted on a foundation on which the utility meter pedestal is operatively mounted.

The utility meter pedestal includes a separate conduit made from a suitable plastic material which is mounted in a position parallel to the elongated rigid steel pipe for housing communication cables such as phone, television, and the like, which are to be installed through the same underground utility service which provides the electrical utility service line. The conduit for the communication cables has its upper end secured to the lower end of the top back plate, and it is also secured to the foundation upper mounting plate at an intermediate portion of its overall length. The utility meter pedestal includes an adjustable mounting bracket secured to the top back plate which is adapted to have mounted thereon a telephone interface box. The adjustable mounting bracket may be adjusted to different positions to permit the mounting thereon telephone interface boxes of various sizes.

The foundation lower mounting plate for the elongated rigid steel pipe is adapted to be secured to the outer face of a building foundation at a below grade location, and to be fastened to the foundation by any suitable means as by power driven nails. The foundation upper mounting plate is provided in three different configurations which permits the utility meter pedestal to be installed selectively on a building foundation wherein a siding is to be installed on the exterior building walls, or on a building foundation having a brick ledge.

BRIEF DESCRIPTION OF THE DRAWINGS

FIG. 1 is a broken, front elevation view of a preconstruction utility meter pedestal made in accordance with the principles of the present invention and which is provided with a foundation first embodiment foundation upper mounting plate.

FIG. 2 is a broken, right side elevation view of the preconstruction utility meter pedestal illustrated in FIG. 1, and showing the utility meter pedestal mounted to the outer side of a building foundation wall prior to erection of a building on the foundation, and which building will have a siding on the exterior walls thereof.

FIG. 3 is a horizontal perspective view of the utility meter pedestal illustrated in FIG. 1 and 2, and which is provided with a foundation first embodiment upper mounting plate for attaching the utility meter pedestal to the outer side of a building foundation.

FIG. 3A is an elevation perspective view of the front side of a foundation second embodiment upper mounting plate.

FIG. 3B is an elevation perspective view of the front side of a foundation third embodiment upper mounting plate.

FIG. 4 is a fragmentary, enlarged front elevation view, with parts removed, of the upper end structure of the preconstruction utility meter pedestal shown in FIG. 1.

FIG. 5 is an enlarged, fragmentary, rear view of the upper end structure of the preconstruction utility meter pedestal illustrated in FIG. 2, taken in the direction of the arrow marked "5" in FIG. 2.

FIG. 6 is an enlarged, fragmentary, right side elevation view of the utility meter pedestal upper end structure illustrated in FIG. 4, taken along the line 6—6 thereof, and looking in the direction of the arrows.

FIG. 7 is an enlarged, fragmentary, elevation view, with parts removed, of the utility meter pedestal structure illustrated in FIG. 2, taken along the line 7—7 thereof, and looking in the direction of the arrows.

FIG. 8 is a right side elevation view of the utility meter pedestal structure illustrated in FIG. 7, and showing that structure mounted on a foundation first embodiment upper mounting plate on a building foundation.

FIG. 11 is a fragmentary, right side elevation view of the lower portion of the utility meter pedestal of the invention, and showing a side view of the fastening of the foundation second embodiment upper mounting plate of FIG. 3A to a building foundation outer surface and brick ledge.

FIG. 12 is an enlarged, fragmentary, elevation view of the foundation second embodiment upper mounting plate structure illustrated in FIG. 11.

FIG. 13 is a fragmentary, horizontal perspective view of the lower end of the utility meter pedestal shown in FIG. 1, and provided with the foundation third embodiment upper mounting plate of FIG. 3B for use when the utility meter pedestal is to be installed on a building foundation having a brick ledge.

FIG. 14 is an enlarged, fragmentary, right side elevation view of the utility meter pedestal foundation third embodiment upper mounting plate illustrated in FIGS. 3 and 13, and showing it mounted on, and fastened to, the outer surface of a building foundation having a brick ledge.

FIG. 15 is a fragmentary, right side elevation view of the lower end of the utility meter pedestal illustrated in FIG. 1, and showing the foundation third embodiment upper mounting plate illustrated in FIGS. 3B and 13, used in the installation of the utility meter pedestal on a building foundation prior to the erection of a building on the foundation, and which building will have a siding on the exterior walls thereof.

DESCRIPTION OF THE PREFERRED EMBODIMENTS

Figure 9:
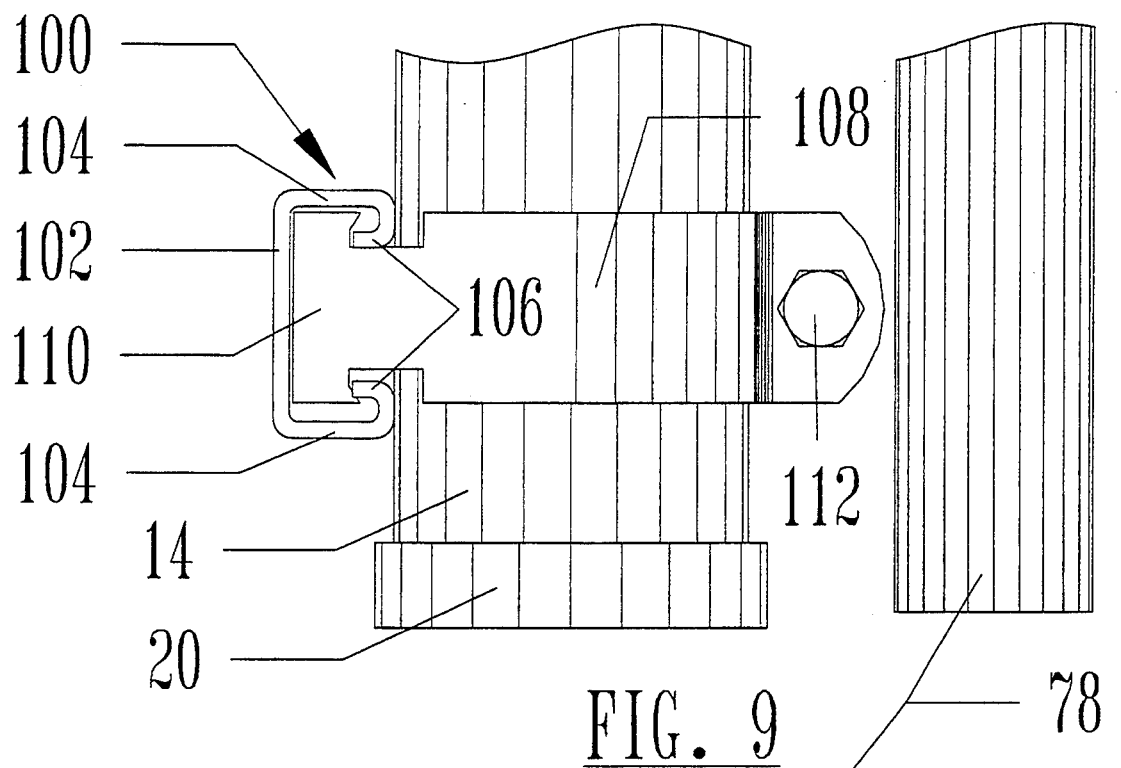
FIG. 9 is an enlarged, fragmentary, elevation view, with parts removed, of the utility meter pedestal lower end structure illustrated in FIG. 2, taken along the line 9—9 thereof, and looking in the direction of the arrows.

Referring now to the drawings, and in particular to FIGS. 1 and 2, the numeral 10 generally designates a preconstruction utility meter pedestal made in accordance with the invention. FIG. 2 shows the utility meter pedestal 10 operatively mounted on a poured concrete building foundation 12 for a building which would have the exterior walls covered with a conventional standard siding such as an aluminum siding. The utility meter pedestal 10 comprises an elongated vertical tubular support member 14, such as an elongated, rigid steel pipe which is open, at the top and bottom ends thereof. A metal utility meter box 16 is rotatably, adjustably secured to the top end of the elongated rigid steel pipe 14 and has operatively mounted therein a conventional utility meter having a glass face 18 which extends forwardly through the front wall face of the utility meter box 16. The elongated rigid steel pipe 14 functions as both a vertical support member for the metal utility meter box 16 and an electrical service line conduit for conducting or housing an electrical service line, from an underground utility service line, to the utility meter in the metal utility box 16. As shown in FIGS. 1 and 2, the elongated rigid steel pipe 14 is provided on the lower end thereof with a conventional bushing 20 for the lower end of the elongated rigid steel pipe 14 for the reception of an underground electrical service line.

As shown in FIG. 4, the upper end of the elongated rigid vertical steel pipe 14 extends through a suitable opening in the lower wall 24 of the metal utility meter box 16. The metal utility meter box 16 is rotatably, adjustably secured to the elongated rigid steel pipe 14 by a suitable outside lock nut 26 and an inside grounding locknut 28. A bushing 22 is mounted on the upper end of the elongated rigid vertical steel pipe 14. The last described mounting structure for securing the utility meter box 16 to the upper end of the elongated rigid steel pipe permits the utility meter box 16 to be rotatably adjusted to a desired position on the elongated rigid steel pipe 14, as required by conditions encountered during the construction of a building wall on a foundation.

As shown in FIGS. 1-5, the utility meter pedestal 10 is provided with a top back support plate 30 which has its upper end secured to the rear side of the metal utility meter box 16 by a plurality of suitable machine bolts 32 (FIG. 5) which extend through the rear wall of the metal utility meter box and have operatively mounted thereon suitable locknuts 34 (FIG. 4). The bolts 32 are permanently secured to the top back plate 30 by any suitable means, as by having the heads thereof peened, so that the nuts 34 can be removed from the front end of the bolts 32 and the utility meter box 16 changed without removing the pedestal 10 from a building on which it is mounted.

As best seen in FIGS. 4 and 6, a C-clamp, generally indicated by the numeral 36, is releasably mounted around the upper end of the elongated rigid metal pipe 14 in a position spaced downward from the metal utility meter box outside locknut 26. The C-clamp 36 is of a conventional type which includes a bight portion 38 (FIG. 6) and a pair of integral curved clamp arms 40 and 42 (FIG. 4) which are seated around the perimeter of the elongated rigid steel pipe 14. The C-clamp bight portion 38 is fixedly secured to the top back support plate 30 by a suitable bolt 44 (FIGS. 5 and 6), which is extended through the top back support plate 30 and passes through a suitable annular spacer 46 and through an opening in the clamp bight portion 38 and into operative engagement with a locknut 48 (FIG. 6). The bolt 44 is permanently secured to the top back support plate 30 in the same manner used for securing the previously discussed top back support plate bolts 32. As shown in FIG. 4, the two curved clamp arms 40 and 42 are fixedly retained on the elongated rigid metal pipe 14 by a suitable bolt 50 that is mounted through openings in the front ends of the integral curved clamp arms 40 and 42 and into threaded engagement with a locknut 52.

As shown in FIGS. 1 and 4, the utility meter pedestal 10 is provided with a temporary electric power box 54 which is disposed beneath the metal utility meter box 16, to the left of the elongated rigid steel pipe 14, as viewed from the front of the utility meter pedestal 10. The temporary electric power box 54 is provided with a upwardly extended conduit nipple 56, on the upper end thereof, and which is fixedly secured to said box 54 by any suitable means. The upper end of the conduit nipple 56 is extended through a suitable opening in the bottom wall of the metal utility meter box 16 and is secured to the lower wall 24 of the metal utility meter box 16 by an outside integral flange 58 and inside locknut 60. As shown in FIGS. 1 and 4, the temporary electric power box 54 is secured to the elongated rigid steel pipe 14 by a C-clamp generally indicated by the numeral 36a. The clamp 36a is constructed in the same manner as the previously discussed C-clamp 36 and is connected to a side wall of the temporary electric power box 54 in the same manner as the clamp 36 is permanently attached to the top back support plate 30.

The parts of the C-clamp 36a which are the same as the parts of the C-clamp 36 have been marked with the same reference numerals followed by the small letter "a". Temporary electric power is supplied through a ground fault interrupter duplex outlet located in box 54.

As best seen in FIGS. 4 and 6, the elongated rigid steel pipe 14 is releasably secured to the top back support plate 30 by a second C-shaped clamp 36b which is disposed in a position spaced downwardly from the temporary electric power box clamp 36a. The parts of the C-shaped clamp 36b and the parts for attaching it to the top back support plate 30 have been marked with the same reference numerals, followed by the small letter "b", as used in the description of the first described C-shaped clamp 36.

As shown in FIG. 6, an attachment arm 62, in the form of an elongated flat plate 62, has an upper end thereof secured by the mounting bolt 44b for the pipe clamp 36b to the top back plate 30. The other end of the attachment arm 62 is fixedly secured by a bolt and a suitable nut (not shown) to the bight or rear portion 66 of a conduit clamp, generally indicated by the numeral 68. The clamp 68 has a pair of integral curved clamp arms 70 and 72 (FIG. 4) which are disposed around the upper end of a vertically disposed communication cable conduit 78. The clamp arms 70 and 72 are releasably secured together by a suitable bolt 74 and a nut 76. The C-clamp 68 functions to hold the upper end of the communication cable conduit 78 in a position spaced from the elongated rigid steel pipe 14 and in a position parallel thereto.

As best seen in FIGS. 4 and 6, the numeral 80 generally designates an adjustable mounting bracket to accommodate a telephone interface box which can be installed at the same time that the utility meter pedestal 10 is installed, so as to allow one contractor to hook up both the electric and phone lines to a job site. As shown in FIG. 4, the telephone interface box mounting bracket 80 includes an inner plate portion 82 which is releasably secured to the front face of the top back support plate 30, in an intermediate position vertically, between the elongated rigid steel pipe clamps 36 and 36a, by a pair of suitable bolts 84 and nuts 86. The heads of the bolts 84 are seen in FIG. 5, and they are permanently fixed to the top back support plate 30 by any suitable means, as being peened in place. As shown in FIG. 3, the bracket inner plate portion 82 is provided at the right side thereof with an integral, forwardly extended flange 88, which is also integrally connected at its outer end to an outer plate portion 90 which is disposed parallel to the inner plate portion 82. As shown in the drawings, and in particular FIG. 4, the telephone interface box mounting bracket 80 is mounted in a position for the reception of a two line interface telephone box. If it is desired to mount a larger box containing more than two lines, than the bracket 80 may be released from the position shown in FIG. 4 and moved outwardly to the right, to position the bolt holes 92 over the bolts 84 for positioning the bracket 80 in a position to accept a larger telephone box. The numeral 94 designates mounting bolt holes for mounting a telephone box on the outer plate portion 90.

FIG. 2 illustrates the installation of the utility meter pedestal 10 on a building foundation 12 on which is to be mounted a building which is to have the outer walls thereof provided with a suitable siding, such as an aluminum siding. The utility meter pedestal 10 is illustrated as being fixedly mounted on the outer face of the building foundation 12 by a pair of mounting plates designated as an upper mounting plate 96 and a lower mounting plate 98. The upper and lower mounting plates 96 and 98 are secured to the outer face of the building foundation 12 by any suitable fastening means, such as by power driven nails 99.

Figure 10:
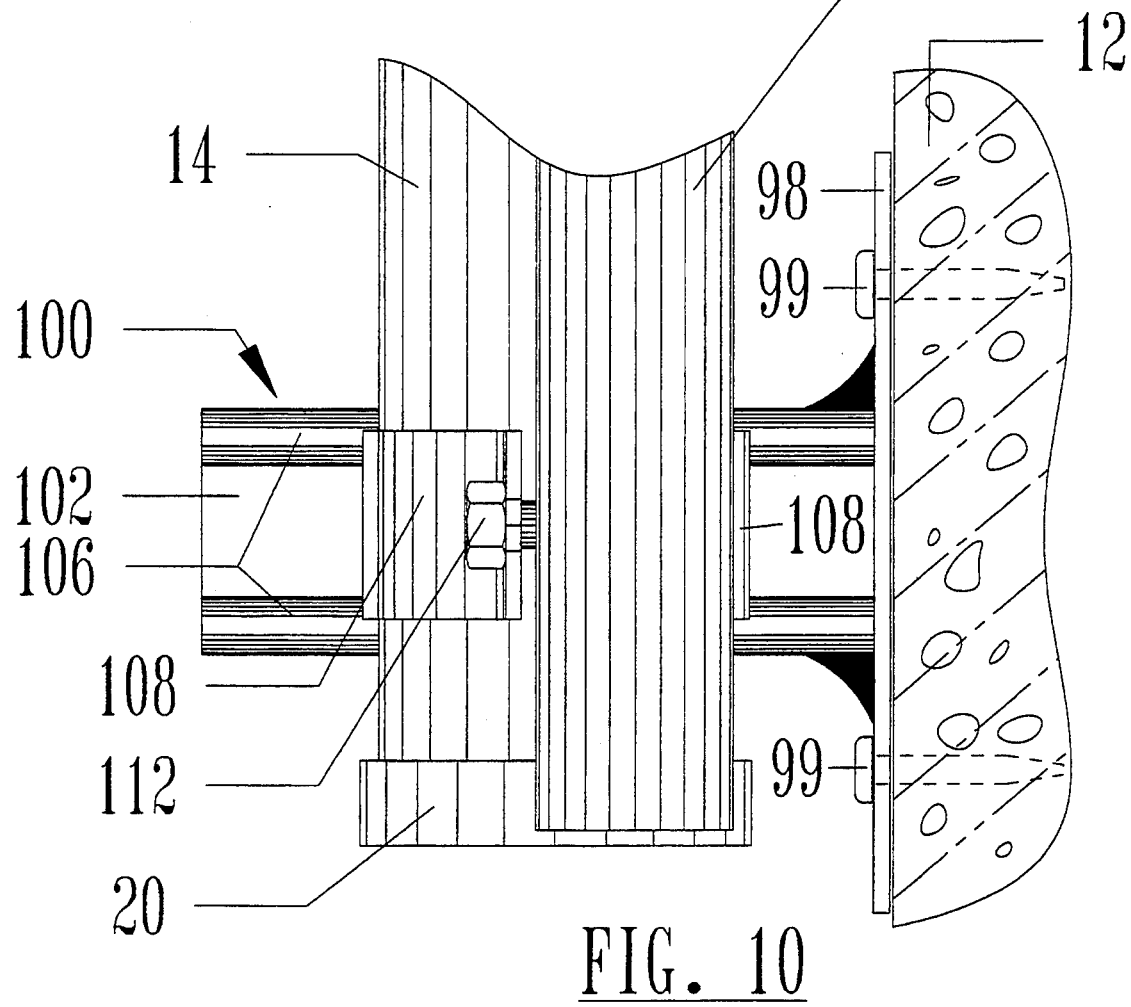
FIG. 10 is a slightly enlarged, fragmentary, right side elevation view of the utility meter pedestal lower end structure illustrated in FIG. 9, and showing that structure mounted on a foundation lower mounting plate.

As shown in FIGS. 2 and 10, the lower end of the elongated vertical rigid steel pipe 14 is fastened to the lower mounting plate 98 by an adjustable clamping means, generally indicated by the numeral 100. As best seen in FIG. 10, the adjustable clamping means 100 includes a channel member which is disposed perpendicular to the outer face of the lower mounting plate 98, and which has its inner end fixedly secured to the lower mounting plate 98 by any suitable means, as by welding. The adjustable clamping means channel includes a bottom wall 102 and a pair of integral side walls 104 (FIG. 9). The free ends of the channel side walls 104 are rolled or turned over inwardly, to form side wall edges which are rounded on the outer surface thereof and which are C-shaped in cross section. The adjustable clamping means 100 further includes a pair of C-shaped clamping straps or arms 108 (FIGS. 3 and 10). Each of the clamp arms 108 have a T-shaped end which is slidably mounted in the adjustable clamping means channel member to permit sliding of the clamp arms 108 endwise in the channel shaped member but which are restrained from coming out of the channel shaped member by the T-shaped ends slidably engaging the inner ends of the C-shaped, rolled over channel side walls 106 (FIG. 10). The other ends of the clamp arms 108 are adapted to be fastened together by a suitable bolt and nut means 112 for clamping the elongated rigid steel pipe 14 in a selected adjusted position in the channel shaped member of the adjustable clamping means 100.

As shown in FIGS. 1, 2 and 3, the elongated rigid steel pipe 14 is adjustably secured, as a midpoint thereon, to the upper mounting plate 96 by an adjustable clamping means indicated generally by the numeral 100a, and which is identical to the adjustable clamping means 100 for attaching the lower end of the elongated rigid metal pipe 14 to the lower mounting plate 98. The only difference is that the channel shaped member having a bottom wall 102a is welded in a flat position on the surface of the upper mounting plate 96 and in a position transverse, or 90 degrees relative to the position of the channel shaped bottom wall 102 of the adjustable clamping means 100. Accordingly, the adjustable clamping means 100a permits the elongated rigid steel pipe 14 to be adjusted in a direction 90 degrees to the adjustment of the adjustable clamping means 100, so as to permit lateral adjustment of the elongated rigid steel pipe 14 to plumb said pipe vertically during a mounting operation of the same on a building foundation. The parts of the adjustable clamping means 100a have been marked in FIGS. 7 and 8 with the same reference numerals as used in designating the various parts of the adjustable clamping means 100, followed by the small letter "a".

As shown in FIGS. 7 and 8, the communication cable conduit 78 is adjustably secured, at a midpoint position thereon, to the upper mounting plate 96 by an adjustable clamping means 100b, which is identical to the adjustable clamping means 100 and 100a. As shown in FIGS. 3 and 7, the adjustable clamping means 100b shares the transverse channel shaped member having a bottom wall 102a.

As shown in FIGS. 1, 2, 3 and 5, a conventional top mount transverse bracket, generally indicated by the numeral 116, is fixedly secured to the back of the utility metal meter box 16, and said bracket 116 is attached to a building stud wall when the utility meter pedestal 10 is mounted on a building foundation on which is to be built a brick sided building. If the utility meter pedestal 10 is to be attached to a sided building, then the bracket 116 is flattened out and it is attached directly to the building wall studs. As shown in FIG. 5, the meter bracket 116 is provided with a central portion 118 that is secured to the back face of the metal utility meter box 16 by suitable fasteners, as by the bolt and nut combination indicated by the numeral 120. The outer end portions or bracket arms 122 of the meter bracket 116 are offset rearwardly from the central portion 118, a distance of approximately the thickness of a brick siding. The bracket arms 122 are adapted to be fastened to the studs of a building by nails driven through the holes 124 in the bracket arms 122.

In use, the utility meter pedestal 10 is assembled with all parts secured together in the positions shown in FIGS. 1, 2 and 3. The utility meter pedestal 10 is then positioned against a building foundation 12, as shown in FIG. 2, with the upper and lower mounting plates 96 and 98, respectively, in the vertically spaced apart positions shown in FIG. 2, and with the lower mounting plate 98 in a position below foundation grade foundation.

The utility meter pedestal 10 is positioned with the elongated rigid steel pipe 14 in a vertical position and the upper and lower mounting plates 96 and 98, respectively, are fastened to the foundation 12 by power driven nails 99. If needed, a final plumb adjustment for the elongated rigid steel pipe 14 may be made, by adjusting the adjustable clamping means 100 and 100a. A horizontal plumb for the communication cable conduit 78 may be carried out by adjusting the adjustable clamping means 100b.

FIG. 3A shows a foundation second embodiment upper mounting plate which includes a vertical plate 96a and an integral flange 130 on the upper end thereof, which is positioned at a right angle relative to the plate 96a. The channel shaped member of the adjustable clamping means 100a is fixed, by any suitable means, as by welding, to the outer or front face of the upper mounting plate 96a, along the upper edge thereof. FIGS. 11 and 12, show the mounting of the foundation second embodiment upper mounting plate 96a on a building foundation 126 wherein the vertical mounting plate 96a is mounted against the outer or front face of the foundation 126 and the right angle flange 130 is positioned on a brick ledge 128. The vertical mounting plate 96a and the right angled flange 130 are fastened to the foundation front face and brick ledge 128, respectively, by any suitable means, as by power driven nails 99. It will be seen that the addition of the integral right angled flange 130, and the fastening thereof to the brick ledge 128, provides further support for the utility meter pedestal 10 in a vertical direction.

FIG. 3B shows a foundation third embodiment upper mounting plate which is the same, with one exception, as the mounting plate 96a shown in FIG. 3A, and it is marked with the same reference numerals followed by the small letter "b". The only difference between the upper mounting plate 96b and 96a is that the integral flange 130b on the upper end thereof, is not as wide as the flange 130 on the upper mounting plate 96a of FIG. 3A. An optimum width for the flange 130b is one inch. The foundation third embodiment upper mounting plate 96b of FIG. 3B is shown attached to the elongated rigid steel pipe 14 and the communication cable conduit 78 in FIG. 13. FIG. 14 shows the mounting of the upper mounting plate 96b, with the right angle flange 130b seated on a brick ledge 128 of a building foundation 126 and with the mounting plate 96b positioned against the building foundation front face and secured thereto by power driven nails 99. The right angle flange 130b is not secured to the brick ledge 128. The upper mounting plate flange 130b extends inwardly over the brick ledge 128 and it adds vertical support to the utility meter pedestal 10.

FIG. 15 is a view similar to FIG. 14 and showing the foundation third embodiment upper mounting plate 96b with the right angle flange 130b mounted on the top surface of a building foundation 12a which is to be provided with a siding, such as an aluminum siding. The upper mounting plate 96b is positioned against the building foundation front face and secured thereto by power driven nails 99.

It will be seen, that the elongated, rigid steel pipe 14 functions both as a support and utility service line conduit.

What is claimed is:

1. A preconstruction utility meter pedestal (10), for use with underground utility service, and which is adapted to be installed on a building foundation having a top surface and an outer surface, prior to the construction of a building on said foundation, wherein said pedestal (10) comprises:
   (a) an elongated, rigid support and utility service line conduit (14) having an upper end and a lower end, and being of such length so as to extend vertically both below grade and above the top surface of a building foundation when the pedestal is in an installed condition thereon;
   (b) a rigid, lower mounting plate (98) secured to said rigid support and utility service line conduit (14) adjacent the lower end thereof, for being positioned in a plane parallel to the outer surface, and secured thereto, of a building foundation when the pedestal (10) is in an installed condition thereon;
   (c) a rigid, upper mounting plate (96, 96a, 96b) secured to said utility service line conduit (14) at an intermediate position between the upper and lower ends of said utility service line conduit (14), for being positioned in a plane parallel to the outer surface, and secured thereto, of a building foundation when the pedestal (10) is in an installed condition thereon; and,
   (d) a utility meter box (16) secured directly to the upper end of said utility service line conduit (14) for supporting the utility meter box (16) and communicating with the interior of the utility meter box (16) to permit an electrical service line conducted through said utility service line conduit (14) from an underground utility service to be electrically connected to an electric meter (18) in said utility meter box, and said utility meter box (16) having a back face for being positioned in a plane parallel to the outer surface of a building foundation when the pedestal (10) is in an installed condition thereon.

2. A preconstruction utility meter pedestal (10), for use with underground utility service, and which is adapted to be installed on a building foundation having a top surface and an outer surface, prior to the construction of a building on said foundation, wherein said pedestal (10) comprises:
   (a) an elongated, rigid support and utility service line conduit (14) having an upper end and a lower end, and being of such length so as to extend vertically both below grade and above the top surface of a building foundation when the pedestal (10) is in an installed condition thereon;
   (b) a rigid, lower mounting plate (98) secured to said rigid support and utility service line conduit (14) adjacent the lower end thereof, for being positioned in a plane parallel to the outer surface, and secured thereto, of a building foundation when the pedestal (10) is in an installed condition thereon;
   (c) a rigid, upper mounting plate (96, 96a, 96b) secured to said utility service line conduit (14) at an intermediate position between the upper and lower ends of said utility service line conduit (14), for being positioned in a plane parallel to the outer surface, and secured thereto, of a building foundation when the pedestal (10) is in an installed condition thereon; and,
   (d) a utility meter box (16) secured directly to the upper end of said utility service line conduit (14) for supporting the utility meter box (16) and communicating with the interior of the utility meter box (16) to permit an electrical service line conducted through said utility service line conduit (14) from an underground utility service to be electrically connected to an electric meter (18) in said utility meter box, and said utility meter box (16) having a back face for being positioned in a plane parallel to the outer surface of a building foundation when the pedestal (10) is in an installed condition thereon; and,
   (e) said utility meter box (16) is rotatably, adjustably secured to the upper end of said utility service line conduit (14).

3. A preconstruction utility meter pedestal (10), as defined in claim 2, wherein:
   (a) the rigid, lower mounting plate (98) is secured to said utility service line conduit (14) by an adjustable clamping means (100) to allow said utility service line conduit (14) to be adjusted to vertical plumb after said pedestal (10) is in an installed condition on a building foundation;
   (b) said rigid, upper mounting plate (96, 96a, 96b) is secured to said utility service line conduit (14) by an adjustable clamping means (100a) for adjusting said utility service line conduit (14) to vertical plumb after said pedestal (10) is in an installed condition on a building foundation; and,
   (c) said adjustable clamping means (100a, 100) for adjustably securing said utility service line conduit (14) to said upper (96, 96a, 96b) and lower (98) mounting plates are configured for spacing the pedestal (10) outwardly from and parallel to the outer surface of a building foundation when the pedestal (10) is in an installed condition thereon.

4. A preconstruction utility meter pedestal (10) as defined in claim 2, including:
   (a) a top back support plate (30) secured to the back face of said utility meter box (16) and having a downwardly extended portion;
   (b) a communication interface box mounting bracket (80) secured to said top back support plate (30) downwardly extended portion;

(c) a communication cable conduit (78) adjustably secured to said rigid, upper mounting plate (96, 96a, 96b) at an intermediate point on said communication cable conduit (78); and, (d) the upper end of said communication cable conduit (78) being secured to said top back support plate (30) downwardly extended portion.

5. A preconstruction utility meter pedestal (10) as defined in claim 2, including:

(a) a temporary electric power box (54) attached to and supported by said utility service line conduit (14) and electrically connected through an electrical conduit nipple (56) to an electric meter (18) in the utility meter box (16).

6. A preconstruction utility meter pedestal (10) as defined in claim 2, wherein:

(a) said rigid, upper mounting plate (96a) is provided along the upper edge thereof with an integral right angle flange (130) that is wider than one inch for extension over and securing to a brick ledge (128) of a building foundation when said pedestal (10) is in an installed condition thereon.

7. A preconstruction utility meter pedestal (10) as defined in claim 2, wherein:

(a) said rigid, upper mounting plate (96b) is provided with an integral right angle flange (130b), along the upper edge thereof, that is at least one inch wide for extension over and seating on a building foundation when said pedestal (10) is in an installed condition thereon.

* * * * *